Patented July 3, 1934

1,964,973

UNITED STATES PATENT OFFICE 1,964,973

1 (3'4' DIOXYALKYLENE PHENYL) 2 AMINO-ALKANOL (1)

Max Bockmühl and Gustav Ehrhart, Frankfort-on-the-Main, Germany, assignors to Winthrop Chemical Company, Inc., New York, N. Y., a corporation of New York No Drawing. Application September 8, 1932, Serial No. 632,266. In Germany September 16, 1931

6 Claims. (Cl. 260—54)

The present invention relates to 1(3'4'dioxyalkylene phenyl) 2 amino alkanol (1), more particularly to compounds of the following general formula

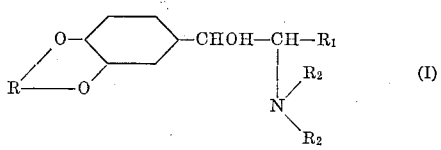

wherein R stands for a radical of the group consisting of methylene, ethylene and substituted ethylene, $R_1$ stands for hydrogen or alkyl and $R_2$ for hydrogen or a univalent hydrocarbon radical.

We have found that compounds of the above constitution, which can be obtained by transforming an aryl-alkylketone, possessing in the aryl nucleus two hydroxyl groups which are in ortho position to each other and simultaneously etherified by the methylene radical, ethylene radical or substituted ethylene radical, into the 1-aryl-2-amino-alcohols-1, are valuable therapeutics and have especially a strongly marked action on the uterus.

The new compounds of the above constitution can be obtained in various manners. For instance, they can be obtained by halogenating ketones of the following general formula

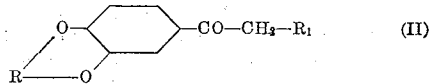

(wherein R and $R_1$ have the same meaning as in Formula I) in the aliphatic side chain, causing primary or secondary amines to act upon the halogen-substituted ketones so obtained of the following general formula

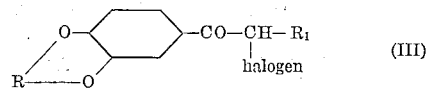

and reducing the amino-ketones hereby formed. It has been found to be advantageous to perform the reaction of amines and halogen-ketones while using secondary amines. In case final products containing a primary amino-group are to be obtained, the secondary amine should contain two aralkyl groups; in case a final product containing an alkyl-substituted secondary amino-group is to be obtained, an alkyl-aralkyl-amine is used. Said aralkyl groups are split off during the subsequent reduction process, if the latter is performed by hydrogenating in the presence of precious metal catalysts, such as platinum or palladium. Otherwise such a catalytic hydrogenation process is to be carried out in order to split off the said aralkyl groups, if this is desired.

The new compounds can also be obtained by introducing the nitroso-group into the ketones of the above Formula II, for example, by causing nitrous acid to act upon these ketones and then reducing the isonitroso-ketones thus obtained. In this process nitrous acid is preferably developed in the solution containing the ketones by adding a salt or an ester of nitrous acid, e. g. sodium nitrite or butyl nitrite, to the said solution and then introducing a mineral acid, e. g. hydrochloric acid, into the solution. The isonitroso-ketones thus obtained are subjected to a reduction process, whereby the keto-group is transformed into the alcohol group and the isonitroso-group is simultaneously reduced to the amino-group. The reduction is preferably carried out by a catalytic hydrogenation, e. g. in the presence of a nickel catalyst, or in the presence of precious metal catalysts. In order to obtain compounds containing a secondary amino group, the primary amino group of the products so obtained may be subjected to an alkylation process.

Another method for the manufacture of the new aryl-amino-alcohols consists in using phenyl-alkyl-ketones substituted in the 3- and 4-position of the phenyl nucleus by hydroxy groups. These compounds can be subjected to the aforesaid processes during which at any stage the free hydroxy groups can be etherified in order to obtain compounds of the above Formula I.

The following examples illustrate the invention.

(1) 13.5 grams of 3.4-methylene-dioxypropiophenone are dissolved in 200 cc. of methylene chloride and into this solution 12 grams of bromine are introduced, drop by drop. The dark red solution is gradually decolorized by stirring. The liquid is then concentrated; the residue is dissolved in ether and the ethereal solution is washed with sodium bicarbonate. The liquid which has been dried by means of sodium sulfate is concentrated and the residue is distilled under reduced pressure. The product boils at 155° C. under a pressure of 3 mm.

15 grams of the 3.4-methylenedioxybromo-propiophenone thus obtained are dissolved in 30 cc. of absolute alcohol and the solution is mixed with 14 grams of methylbenzylamine. After allowing the mixture to stand for about 3 hours, the methylbenzylamine-hydrobromide which has been formed by ether is precipitated and filtered by suction. The filtrate is concentrated in a vacuum and dissolved in ether. The ethereal solution is filtered and shaken with dilute hydrochloric acid; the hydrochloric acid solution is separated and mixed with potassium carbonate. The base which separates is dissolved in ether and dried by means of sodium sulfate. After distillation of the ether, a residue remains which is distilled under reduced pressure. The 1-(3'.4'-methylenedioxy-phenyl)-2-N-methyl-N-benzyl-aminopropanone-1 of the following formula:

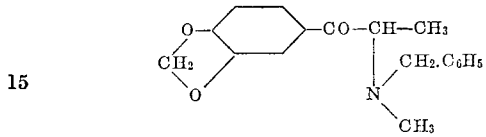

distils at 186° C. under a pressure of 1.5 mm. in the form of a faintly colored oil.

8.7 grams of the distilled base are dissolved in 150 cc. of alcohol and hydrogenated with hydrogen in the presence of a palladium catalyst. After the absorption of hydrogen is complete, the catalyst is filtered by suction and the filtrate is concentrated under reduced pressure. The residue is dissolved in ether and mixed with alcoholic hydrochloric acid until the reaction is feebly acid to Congo paper. The precipitated and isolated hydrochloride of 1-(3'.4'-methylenedioxy-phenyl)-2-methylaminopropanol-1 of the following formula

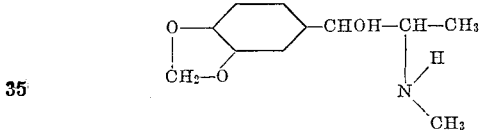

melts, after recrystallization from alcohol, at 208° C.–209° C.

The 3.4-methylenedioxypropiophenone used as parent material is obtained in the following manner: 48 grams of 3.4 - dihydroxypropiophenone are dissolved in a solution of 33 grams of potassium hydroxide in 200 cc. of alcohol and, after addition of 30 grams of methylene chloride, heated in the tube for 8 hours at 120° C. After cooling, the potassium chloride which has formed is filtered by suction and the filtrate is concentrated under reduced pressure. The residue is dissolved in ether and washed with dilute caustic soda solution. The ethereal solution is dried by means of sodium sulfate and, after distillation of the ether, distilled under reduced pressure. The resultant 3.4-methylenedioxypropiophenone boils at 128° C. under a pressure of 3.5 mm.

(2) 35.6 grams of 3.4-methylenedioxypropiophenone are dissolved in 250 cc. of methylene chloride and, after addition of 20.6 grams of butyl nitrite, the solution is mixed with the equivalent quantity of ethereal hydrochloric acid. After allowing the whole to stand over night, the methylene chloride and the ether are removed by distillation and the residue is dissolved in ether. The ethereal solution is shaken with dilute caustic soda solution, the aqueous solution is separated and acidified with concentrated hydrochloric acid. The 3.4-methylenedioxyisonitrosopropiophenone which crystallizes, has the following formula:

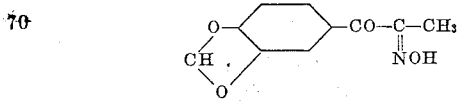

and melts, when recrystallized from alcohol, at 153° C.–154° C.

15 grams of the isonitroso compound are dissolved in 200 cc. of alcohol and hydrogenated with hydrogen in the presence of a nickel catalyst. After the absorption of hydrogen is complete, the catalyst is filtered by suction and the alcohol is evaporated under reduced pressure. The residue is neutralized with alcoholic hydrochloric acid and the hydrochloride of 1-(3'.4'-methylenedioxy-phenyl)-2-aminopropanol-1 is precipitated by means of acetone. It has the following formula:

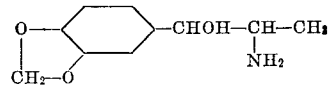

The compound is recrystallized from methanol, while adding ether. It melts at 202° C.–203° C.

(3) 19.2 grams of 3.4-ethylenedioxypropiophenone are dissolved in 200 cc. of methylene chloride and 16 grams of bromine are introduced into this solution, drop by drop. After about 1 to 2 hours, the dark red liquid is decolorized. The solution of methylene chloride which has been filtered is shaken with water and sodium bicarbonate and dried by means of sodium sulfate. The methylene chloride is removed by distillation and the residue is distilled under reduced pressure. The product boils at 103° C.–182° C. under 1.5 mm. pressure.

16.3 grams of the 3.4-ethylenedioxybromopropiophenone thus obtained are dissolved in 20 cc. of alcohol and the solution is mixed with 14.5 grams of benzylmethylamine. After allowing the mixture to stand for several hours, it is mixed with ether and the benzylmethylamine-hydrochloride which has formed is filtered by suction. The filtrate thus obtained is shaken with dilute hydrochloric acid, separated and rendered alkaline by means of potassium carbonate. The oil which separates is taken up in ether dried and the excess of ether is removed by distillation. The sirupy residue is then dissolved in hot hexahydrobenzene. On cooling the 1-(3'.4'-ethylenedioxy-phenyl)-2-N-methyl - N - benzylaminopropanone-1 crystallizes in the form of perfect crystals. It melts at 71° C.–73° C.

9 grams of the crystallized base are dissolved in 200 cc. of alcohol and hydrogenated with hydrogen in the presence of a platinum catalyst. After the calculated quantity of hydrogen has been absorbed, the catalyst is filtered by suction and the filtrate is concentrated in a vacuum. The residue is neutralized with alcoholic hydrochloric acid. The hydrochloride of 1-(3'.4'-ethylenedioxy - phenyl) - 2 - methyl - aminopropanol-1 of the following formula

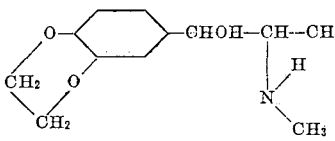

melts, after recrystallization from alcohol, at 225° C.–227° C.

(4) 19.2 grams of 3.4-ethylenedioxypropiophenone are dissolved in 200 cc. of benzene and the solution is mixed with 10.3 grams of butyl nitrite. 15 grams of an ethereal hydrochloric acid of 30% strength are then added to the solution, drop by drop. The liquid is allowed to stand during the night. The product which crystallizes is filtered by suction and washed with benzene. The 3.4-ethylenedioxyisonitrosopropiophenone thus formed melts, after recrystallization from benzene at 142° C.–143° C. 14 grams of the crystallized isonitroso compound are dissolved in 200 cc. of alcohol and hydrogenated at 70° C. with hydrogen in the presence of a nickel catalyst. After the calculated quantity of hydrogen has been absorbed, the nickel catalyst is filtered by suction and the excess of alcohol is removed under reduced pressure. The residue is neutralized with alcoholic hydrochloric acid and the hydrochloride is precipitated by addition of acetone. The 1-(3'.4'-ethylenedioxy-phenyl) -2- aminopropanol-1-hydrochloride melts, after recrystallization from alcohol, at 213° C.

(5) 17.8 grams of 3.4-ethylenedioxyacetophenone are dissolved in 200 cc. of methylene chloride and, after addition of about 10 grams of calcium carbonate, the solution is mixed, drop by drop, with 16 grams of bromine. As soon as the dark red solution is decolorized, it is filtered and the liquid is washed with a solution of sodium bicarbonate. After drying by means of sodium sulfate, the solution of methylene chloride, which has been filtered, is concentrated in a vacuum. The crystalline residue may be redissolved from alcohol. The product melts at 114° C.–116° C.

25.7 grams of the 3.4-ethylenedioxybromacetophenone thus obtained are dissolved in 50 cc. of absolute alcohol and the solution is mixed with 24 grams of methylbenzylamine. After allowing the mixture to stand for several hours, ether is added to the liquid and the methylbenzylamine-hydrobromide which is formed is shaken with water. The ethereal solution is then repeatedly shaken with dilute hydrochloric acid. The 3.4-ethylenedioxymethylbenzylaminoacetophenone is separated in the form of an oil from the acid solution by means of solid potassium carbonate and dissolved in ether. The ethereal solution is dried by means of sodium sulfate and concentrated.

10 grams of the base are dissolved in 200 cc. of alcohol and hydrogenated with hydrogen in the presence of a palladium catalyst. After the absorption of hydrogen is complete, the catalyst is filtered by suction and the liquid is concentrated under reduced pressure. The residue thus obtained is neutralized with alcoholic hydrochloric acid. The hydrochloride of 1-(3'.4'-ethylenedioxy-phenyl) - 2 - methylaminoethanol - 1 which crystallizes has the following formula

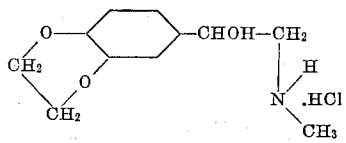

After recrystallization from propyl alcohol it melts at 125° C.–126° C.

The 3.4-ethylenedioxyacetophenone used as parent material is obtained by causing 3.4-dihydroxyacetophenone to react with ethylene bromide. The compound may be distilled under a strongly reduced pressure. The product boils at 153° C. under a pressure of 4 mm.

(6) 20.9 grams of 3.4-hydroxypropylene-dioxy-propiophenone of the following formula:

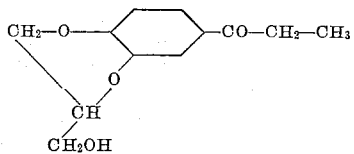

are dissolved in 200 cc. of benzene and, after addition of 12 grams of ethereal hydrochloric acid of 25% strength, 9.3 grams of butyl nitrite are added thereto, drop by drop. After a short time the dark red solution is decolorized. The liquid is then repeatedly shaken with dilute caustic soda solution and the alkaline liquid is acidified with concentrated hydrochloric acid. The isonitroso compound which separates in the form of an oil is dissolved in ether. After the ethereal solution has been dried by means of sodium sulfate, the ether is removed by distillation on the steam bath. An oil remains which does not crystallize; it is taken up in a small quantity of hot acetic acid ester and mixed with hexahydrobenzene until it begins to become feebly turbid. On cooling in the refrigerator, the 3.4-hydroxypropylene-dioxy-isonitrosopropiophenone of the following formula:

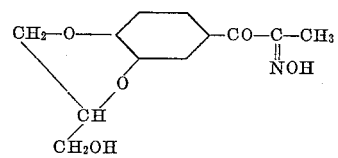

crystallizes. It melts at 141° C.–142° C.

17 grams of the isonitroso compound thus obtained are dissolved in 200 cc. of alcohol and hydrogenated at 80° C. with hydrogen in the presence of a nickel catalyst. As soon as the absorption of hydrogen is complete, the nickel catalyst is filtered by suction and the alcoholic solution is concentrated under reduced pressure. The residue is dissolved in dry acetic acid ester and the solution is mixed with alcoholic hydrochloric acid until the reaction is feebly acid to Congo paper. The hydrochloride which first separates in the form of an oil, crystallizes after some days. The hydrochloride of 3.4-hydroxypropylene - 1'.2'-dioxyphenylaminopropanol of the following formula

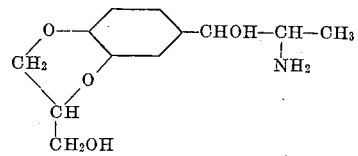

melts, after recrystallization from a mixture of methanol and acetone, at 188° C.–190° C.

The 3.4-hydroxypropylene-dioxypropiophenone used as parent material is obtained by causing 3.4-dihydroxypropiophenone to react in an alcoholic solution with alpha-beta-dibromopropylalcohol, while adding potassium hydroxide. The ketone distils at 210° C. under a pressure of 4.5 mm.

(7) 90 grams of 3.4-dihydroxybutyrophenone and 100 grams of ethylene bromide are added to an alcoholic solution of 55 grams of potassium hydroxide and the whole is heated in an autoclave for 8 hours at 120° C. After cooling the potassium bromide thus formed is filtered by suction and the excess of alcohol is distilled on the steam bath. The residue is dissolved in ether and washed with dilute caustic soda solution. The ethereal solution is dried by means of sodium sulfate, concentrated and the residue is distilled under reduced pressure. The 3.4-ethylenedioxy-butyrophenone is thus obtained and distils at 145° C. under a pressure of 2 mm.

41.2 grams of the distilled ketone are dissolved in 250 cc. of benzene, the solution is mixed with 30 grams of ethereal hydrochloric acid of 20% strength and 20.6 grams of butyl nitrite are gradually introduced, drop by drop. After about 1 hour, the reaction is complete. The light-yellow liquid is mixed with hexahydrobenzene until it begins to become feebly turbid. On cooling the 3.4-ethylenedioxyisonitrosobutyrophenone crystallizes from the solution. It melts at 125° C.–126° C.

21 grams of 3.4-ethylenedioxyisonitrosobutyrophenone are dissolved in 300 cc. of toluene alcohol and, after addition of 30 cc. of a nickel catalyst of 10% strength, the whole is hydrogenated at about 80° C. with hydrogen. After a short time the absorption of hydrogen is complete. The mass is allowed to cool and, after the catalyst has been filtered by suction, the alcoholic solution is concentrated under reduced pressure. A crystalline residue is obtained which is dissolved in a small quantity of alcohol and neutralized with alcoholic hydrochloric acid. On addition of ether, the 1-(3'.4'-ethylenedioxy-phenyl)-2-aminobutanol-1 hydrochloride separates in a crystalline form. After recrystallization from alcohol, the compound melts at 186° C.

(8) 24.5 grams of 3.4-dihydroxybromopropiophenone are dissolved in 120 cc. of absolute alcohol, 39.5 grams of dibenzylamine are added thereto and the whole is boiled in a reflux apparatus for 2 hours. The dibenzylamine-hydrobromide which separates on cooling is filtered by suction and the filtrate is freed from alcohol. The 3.4-dihydroxyphenyldibenzylaminopropiophenone remains which is sufficiently pure for being worked up.

4.6 grams of sodium are dissolved in 100 cc. of alcohol, the 3.4-dihydroxydibenzylaminopropiophenone is added to this solution, 19 grams of ethylene bromide are introduced and the whole is heated in an autoclave for 4 hours at 120° C. The separated sodium bromide is filtered by suction, the filtrate is freed under reduced pressure from alcohol, the residue is dissolved in ether and repeatedly shaken with dilute caustic soda solution. The ethereal extract is dried and the ether is distilled. The residue is dissolved in absolute alcohol and hydrogenated at 50° C.–60° C. with hydrogen in the presence of a palladium catalyst. When the absorption of hydrogen is complete, the catalyst is filtered by suction, the alcohol is distilled and the residue is twice redissolved from acetic acid ester. The 1-(3'.4'-ethylenedioxy)-phenyl-2-aminopropanol-1 melts at 148° C. and has the following formula:

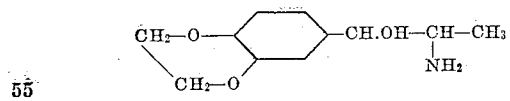

We claim:

1. The compounds of the following general formula

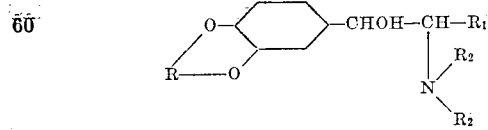

wherein R stands for a radical of the group consisting of methylene, ethylene and substituted ethylene, R₁ stands for hydrogen or alkyl and R₂ for hydrogen or a univalent hydrocarbon radical, said products being valuable therapeutics.

2. The compounds of the following general formula

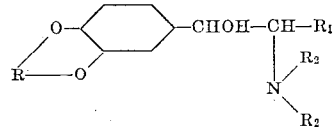

wherein R stands for a radical of the group consisting of methylene, ethylene and alkyl-substituted ethylene, R₁ stands for hydrogen or alkyl containing not more than two carbon atoms and R₂ for hydrogen, alkyl or aralkyl, said products being valuable therapeutics.

3. The compounds of the following general formula

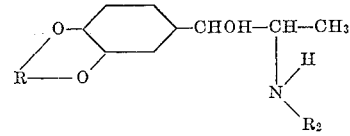

wherein R stands for a radical of the group consisting of methylene, ethylene and 3-hydroxypropylene-1,2 and R₂ stands for hydrogen or methyl, said products being valuable therapeutics.

4. The compounds of the following general formula

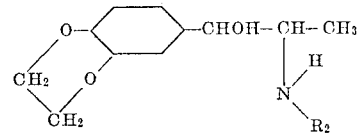

wherein R₂ stands for hydrogen or methyl, said products being valuable therapeutics.

5. The 1-(3'.4'-ethylenedioxy-phenyl)-2-methylaminopropanol-1 of the following formula

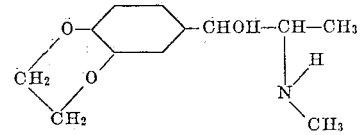

forming a hydrochloride soluble in water and alcohol and melting at 225° C.–227° C., said product being a valuable therapeutic.

6. The 1-(3'.4'-ethylenedioxy-phenyl)-2-aminopropanol-1 of the following formula

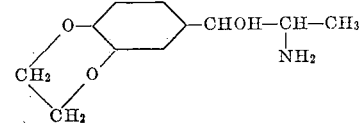

forming a hydrochloride, soluble in water and alcohol and melting at 213° C., said product being a valuable therapeutic.

MAX BOCKMÜHL.
GUSTAV EHRHART.